United States Patent [19]
Aref et al.

[11] 3,857,974
[45] Dec. 31, 1974

[54] PROCESS FOR THE PRODUCTION OF FROZEN EGGS

[75] Inventors: Moustafa M. Aref; John J. Stroz, both of Ottawa, Ontario; Gordon W. Johnson, Ashton, Ontario, all of Canada

[73] Assignee: Canadian Patents & Development Limited, Ottawa, Ontario, Canada

[22] Filed: Nov. 24, 1969

[21] Appl. No.: 879,626

[52] U.S. Cl. ............... 426/148, 426/211, 426/524, 62/64
[51] Int. Cl. ............................................. A23l 1/32
[58] Field of Search ............ 99/113, 192, 196, 198; 426/148, 211, 524; 62/64

[56] References Cited
UNITED STATES PATENTS

| | | | |
|---|---|---|---|
| 1,119,964 | 12/1914 | Keith | 99/196 |
| 1,630,756 | 5/1927 | Parsons | 99/196 |
| 3,404,989 | 10/1968 | Hirtensteiner | 99/192 |

OTHER PUBLICATIONS

Trauberman, "Food Engineering," Cryogenics: For Which Products December, 1966, pp. 86–89. TX 341.26.

*Primary Examiner*—Raymond N. Jones
*Attorney, Agent, or Firm*—Francis W. Lemon; James R. Hughes

[57] ABSTRACT

A frozen food egg substance comprising free flowing discrete particles of the substance, with each particle in pop-corn-like form is produced by dropping the egg substance into direct contact with a non-toxic, liquified gas refrigerant. The egg substance, which may be egg white, egg yolk or homogenized egg yolk and egg white is dropped onto a turbulent surface of the refrigerant, and is removed from it as the discrete particles so that liquified gas on the particles is allowed to evaporate and the particles may be stored in a frozen condition.

8 Claims, No Drawings

3,857,974

PROCESS FOR THE PRODUCTION OF FROZEN EGGS

This invention relates to a frozen egg substance and a method of producing it.

Freezing of eggs is quite a large industry in Canada, the U.S.A. and other parts of the world. Although it was first started about 1920, its growth has been quite phenomenal and the pack is at present about 20 million pounds in Canada and 500 million pounds in the U.S.A.

This growth was due to the fact that half of the lay for the entire year, is produced from March to June inclusive. Storing surplus eggs in the shell at temperatures between 29° and 31° F. has been brought to a high degree of efficiency, yet deterioration does go on slowly — while, when hard frozen, eggs can be held almost indefinitely without destructive changes. Also, the saving in storage space and transportation costs is substantial.

The growth during the past few years seems, however, to have levelled off due to what appears to be saturation of the markets. This saturation is due in great part to the form in which the eggs are frozen at present which limits the use of the frozen product to certain users, mostly bakeries.

At present the eggs are broken, the meats are separated from the shells and put into suitable mixers or "churns" that makes them into a homogeneous, thick, creamy mass. The separated meats are either churned directly if the whole egg is desired, or are first separated into the two components, egg yolk and egg white before churning.

In either case, the churned egg mass is packed into 30 lb. cans after the addition of sugar, salt or other additives. Under freezing conditions used commercially today, the eggs in these 30 lb. cans may be expected to become solidly frozen in about 36 to 72 hours. Depending on the initial state of microbial contamination, many a can of egg is lost because the freeze is so slow that the core becomes sour before it congealed.

It is one object of the invention to provide a method of producing a frozen food egg substance, in which the freezing of the egg substance occurs sufficiently rapidly to substantially reduce any losses which may be incurred by the above mentioned process.

The quality of frozen egg is judged very largely by the number of viable bacteria which it contains. If the breaking stock is of good quality, the removal of the egg meat is done in clean fashion and the freezing is promptly accomplished, the bacterial count is comparable with that of well-handled raw milk. It is the aim of the breaker putting out a quality product to reduce the incidence of these organisms to a minimum. The industry has, therefore, adopted methods for the pasteurization of the egg after removal from the shells but before freezing, using conventional heat exchangers. Still, because of the very slow freezing time necessary at present, the bacteria remaining in the pasteurized eggs do multiply before complete freezing finally stops their activity.

It is further object of the invention to provide a method of producing a frozen food egg substance which substantially reduces the bacteria present in the egg substance and which in some instances eliminates or minimizes the need for pasturization of the egg substance.

Another great disadvantage of present practice is defrosting or thawing the 30 lb. container of frozen eggs. This usually requires 2 days, including tempering in suitable coolers at approximately 40°F, then placing containers in running water till the frozen eggs are thawed. Many bakeries place frozen product under bake-ovens or in warm atmosphere of bakery for 24 to 36 hours before they are ready for use. This protracted thawing time allows bacteria still present in the frozen egg to multiply as the frozen mass is gradually defrosted. Deterioration of the product takes place, and its severity depends on the length of defrosting time and the bacterial content of the frozen egg mass.

Yet another object of the invention is to provide a frozen food egg substance and a method for its production wherein the length of time for defrosting the substance is substantially reduced when compared with known types of frozen food egg substances.

As a rule, the egg white (albumen) defrosts first, and the yolk particles second. Too many bakeries, not realizing this fact, start to use the thawing product before it is completely defrosted taking liquid portions as they separate from the frozen mass. This results in many difficulties since the product should be all defrosted and thoroughly mixed before use to get a uniform and typical egg composition.

A further object of the invention is to provide a frozen food egg substance and a method for its production wherein the substance may be defrosted substantially uniform through its mass.

Many bakers do not require 30 pounds of frozen eggs per day, but once the product is defrosted it should be immediately used to prevent deteriorations. This causes many problems and influences the production costs of small bakeries.

Another object of the present invention is to provide a frozen food egg substance and a method for its production wherein the substance is frozen in a discrete particle form so that only a portion of the substance need be deposited to suit the needs of the consumer.

Known frozen food egg substances now on the market limit the use of frozen eggs to bakeries, even though small bakeries find it somewhat wasteful. Restaurants and similar establishments that need to use small portions at a time find the present substances impractical to use.

Thus to summarize, the main disadvantage of known frozen egg substances is their very slow freezing and the very long time required to bring them from the frozen state to a usuable form. The substance is sold in 30–38 lb. tins or plastic pails and forms a solid block of frozen mass when frozen. These blocks are very difficult to break if only a portion of the block is needed. In addition, when the whole block is needed it requires about 2 days to thaw before it can be used. During this long thawing time, the thawed portion is susceptible to deterioration due to bacterial growth. The thawed product must be used immediately upon completion of thawing or it deteriorates.

According to the invention there is provided a frozen food egg substance, comprising free flowing, discrete particles of said substance, and each said particle is of pop-corn-like form.

The frozen food egg substance may comprise homogenized egg yolk and egg white, egg yolk or egg white.

Further according to the invention there is provided a method of producing a frozen food egg substance, comprising dropping said egg substance in a viscous state into direct contact with a non toxic, liquified gas refrigerant from a liquified gas source, said liquified gas having a temperature below −150°F and a turbulent surface on to which said egg substance falls to form frozen, free flowing pop-corn-like discrete particles, removing said discrete particles from said liquid gas, allowing liquified gas adhering to said particles to evaporate whilst maintaining said discrete particles frozen, and storing said particles in a frozen condition.

In one embodiment of the invention the egg substance to form the frozen food, that is homogenized egg yolk and egg white (albumen), which may have added to it glucose or other additives, and if desired, may be mildly pasteurized, is stored in a viscous state in a cooler having a valve controlled nozzle of about ½ to 2 centimeters in diameter in its base. An open topped container, which is open to atmosphere, is disposed beneath the nozzle, and has a wire basket in it.

In operation the container is partially filled with liquid nitrogen at −320°F and the valve is then opened to allow a steady stream of the egg substance to fall through the nozzle into direct contact with the liquid nitrogen. Whilst liquid nitrogen has been mentioned as the liquified gas, other liquified gases at a temperature of less that −150°F may be used, for example, different natural gases such as helium hydrogen or krypton may be used, or liquid nitrous oxide, or any other non-toxic, liquified gas refrigerant such as liquid flourinated hydrocarbons, an example of which is dichlorodifluoromethane. As the egg substance comes into contact with the liquid nitrogen it forms into pop-corn-like discrete particles which collect in the wire basket. The formation of discrete particles pop-corn-like is thought at least in part to be due to the higher temperature of the egg substance creating a turbulent surface on the liquified gas which causes the egg substance as it freezes, to form into odd shaped particles and provide the pop-corn-like discrete particles, which sink into the wire basket. When a suitable amount of the egg substance in discrete particles has collected in the wire basket the valve is shut-off to prevent the flow of further egg substance into the liquid nitrogen and the wire basket is raised to remove the discrete particles from the liquid nitrogen. Liquid nitrogen adhering to the particles which does not drain into the containers is allowed to substantially evaporate whilst the particles are maintained frozen, and then the particles are preferably packed in polyethylene bags for easy storage and stored at below 0°F, preferably at −10°F, in a frozen condition until required.

An advantage with the process of the invention is that as long as the particles remain frozen they are free flowing, thus facilitating the extraction from a polyethylene bag of the amount required whilst leaving the remainder for later use. The particles, being free flowing, can easily be scooped up and measured or weighed according to the demand and then the portion for immediate use can be left at room temperature, say 68°F, at which the particles thaw and are ready for use in approximately 15 minutes. If desired the frozen particles, because of their pop-corn-like structure may be added, whilst frozen, directly to other ingredients such as flour, sugar, and shortening, and worked out directly in the manner of fresh eggs because the frozen particles thaw almost immediately due to heat generated during the mixing. Alternatively the particles may be transferred directly to a frying pan and melted and fried in the form of an omelet with any of the usual additives that may be added to an omelet mix.

The frozen particles may alternatively be packed in tins, plastic pails or multiwall bags, and may be stored indefinitely in commercial frozen storage facilities.

A further advantage with the process of the invention is the high quality of the frozen substance due to more or less instantaneous freezing in the liquified gas, which kills about 60% to 80% of the bacteria which was present in the egg substance before freezing.

In view of bacteria being killed in this manner in the egg substance pasteurization step, normally necessary in other processes, is either eliminated or minimized, and thus any change in the natural characteristics of the egg substance due to the influence of the heat of pasteurization is either prevented or minimized.

For commercial application the homogenized eggs to be frozen may be placed in a holding tank fitted with a suitable spout. The spout may deliver the viscous egg substance directly into an opening in one end of a tank containing the liquified gas and located under the spout. The tank may be fitted with a mesh-belt or other suitable conveyor to carry the frozen, discrete particles, as they settle in the liquified gas, to a cold storage room through an opening at the other end of the tank. Preferably the cold storage room is double walled and is located on top of the freezing tank and makes use of escaping gas, evaporating from the frozen discrete particles and the liquified gas for partial cooling by circulation between the double walls. The escaping gas could then be vented to atmosphere through appropriate traps. The tank could be supplied with liquid gas from a storage tank directly connected to it and containing compressed, liquified gas.

The frozen discrete particles can accumulate in the cold storage room, and from there be fed to a hopper for continuous packing by hand or semi-automatic for packing, say, multi-wall bags of different sizes from, for example, 1 to 20 or 30 lbs.

The frozen food egg substances of the invention were tested by using them in the preparation of white cake, cream puffs, custard, mayonnaise and sponge cake. In each case the performance of the frozen, homogenized whole egg, egg yolk or egg white was compared to that of the fresh counterpart, and no difference whatsoever could be found by a panel of experts.

As already stated additives may be included in the substance before it is frozen to form the discrete pop-corn-like particles, such additives include meat, onion, spices, salt, pepper, flour, sugar and shortening. If necessary the supply of egg substance to be frozen into discrete pop-corn-like particles may be agitated to keep the additive or additives dispersed therein.

If necessary the liquified gas may be agitated to assist the formation of the discrete pop-corn-like particles, this may be necessary if the container containing the liquified gas is not open to the atmosphere. If necessary the container may be closed to atmosphere and pressurized to reduce the evaporation of liquid gas.

The formation of the discrete pop-corn-like particles may also be assisted by sprinkling the egg substance into the liquified gas. This may be done by using a rotating feed for the egg substance which distributes the egg substance around a circular path in the liquified gas. Alternatively one or more triggered valves may successively drop measured quantities of the egg substance into the liquified gas so that each quantity forms a discrete pop-corn-like particle.

Using liquified fluorinated hydrocarbons may introduce a problem in that some of the liquified gas may be trapped when the discrete particles are packed in, for example, polyethylene bags. This problem may be overcome by allowing a longer period for liquified gas to evaporate from the particles and then vacuum packaging them to allow any remaining gas which evaporates to expand the package. It should be noted that in using liquified hydrocarbons, larger discrete pop-corn-like particles are formed than are formed using liquid nitrogen, this is due to the density of liquid fluorinated hydrocarbons being such that the egg substance freezes as it floats on the liquified gas and so congeals into larger masses than particles which are formed by freezing egg substance as it sinks into liquid nitrogen.

We claim:

1. A frozen food egg substance, comprising free flowing discrete, particles of said substance, and each said particle is of pop-corn-like form.

2. A frozen food egg substance according to claim 1, wherein said egg substance comprises homogenized egg yolk and egg white.

3. A frozen food egg substance according to claim 1, wherein said egg substance comprises egg yolk.

4. A frozen food egg substance acording to claim 1, wherein said egg substance comprises egg white.

5. A method of producing a frozen food egg substance, comprising dropping said egg substance in a viscous state into direct contact with a non-toxic, liquified gas refrigerant from a compressed, liquified gas source, said liquified gas having a temperature below −150°F and a turbulent surface on to which said egg substance falls to form frozen, free flowing pop-corn-like discrete particles, removing said discrete particles from said liquefied gas allowing liquefied gas adhering to said particles to evaporate whilst maintaining said discrete particles frozen, and storing said particles in a frozen condition.

6. A method according to claim 5, wherein said egg substance comprises egg yolk and egg white, and said egg yolk and egg white are homogenized before being passed in said viscous state into direct contact with said cryogenic liquid.

7. A method according to claim 5, wherein said substance comprises egg yolk.

8. A method according to claim 5, wherein said egg substance comprises egg white.

* * * * *